US006078687A

United States Patent [19]
Venkateswar

[11] Patent Number: 6,078,687
[45] Date of Patent: Jun. 20, 2000

[54] QUANTIZATION FOR A DIGITAL PRINTER USING MODULATED IMAGE DATA

[75] Inventor: Vadlamannati Venkateswar, Plano, Tex.

[73] Assignee: Texas Instruments Incorporated, Dallas, Tex.

[21] Appl. No.: 08/993,641

[22] Filed: Dec. 18, 1997

Related U.S. Application Data

[60] Provisional application No. 60/033,628, Dec. 20, 1996.

[51] Int. Cl.[7] .................................................. G06K 9/00
[52] U.S. Cl. ............................................. 382/169
[58] Field of Search .................................. 382/251, 169; 358/465

[56] References Cited

U.S. PATENT DOCUMENTS

| | | | |
|---|---|---|---|
| 4,386,366 | 5/1983 | Mori | 358/135 |
| 4,668,995 | 5/1987 | Chen et al. | 358/282 |
| 5,243,443 | 9/1993 | Eschbach | 358/455 |
| 5,301,242 | 4/1994 | Gonzales et al. | 382/56 |
| 5,367,385 | 11/1994 | Yuan | 358/465 |
| 5,442,461 | 8/1995 | Levien | 358/456 |
| 5,563,721 | 10/1996 | Overton | 358/447 |
| 5,786,843 | 7/1998 | Venkateswar | 347/251 |
| 5,877,865 | 3/1999 | Fukuta | 358/296 |

Primary Examiner—Joseph Mancuso
Assistant Examiner—Paul H. Schirduan
Attorney, Agent, or Firm—Charles A. Brill; Wade James Brady, III; Frederick J. Telecky, Jr.

[57] ABSTRACT

A method of dynamically quantizing pixel data for use by a digital printer system that prints the pixel data with modulated pixel values. The data is first modulated, with the output pixel values being determined by an image screen. (FIGS. 1 and 2). Then, the data is quantized, using different quantization tables for different pixel values of the same image. The parameters that determine which quantization table is used for a particular pixel value include the pixel's position with respect to the screen or the pixel's image content. (FIGS. 3 and 5) In the case of data that is also being compressed with differential pulse code modulation, the quantization can be based on a buffer fullness measure (FIG. 6).

17 Claims, 2 Drawing Sheets

QUANTIZATION FOR A DIGITAL PRINTER USING MODULATED IMAGE DATA

This application claims the benefits of U.S. Provisional Application No. 60/033,628, filed on Dec. 20, 1996.

TECHNICAL FIELD OF THE INVENTION

The present invention relates generally to digital printing systems, and more particularly to a method of quantizing modulated input data for use by the printing system.

RELATED PATENT APPLICATION

This patent application is related to the following patent application assigned to Texas Instruments Incorporated:

U.S. patent application Ser. No. 08/747,291 entitled "Compression for Multi-level Screened Images", filed Nov. 12, 1996.

BACKGROUND OF THE INVENTION

Existing electrophotographic printer technology makes use of a photoconductive drum. Depending on the type of photoconductor used, the drum is either charged or discharged to attract toner, with the charging or discharging accomplished by exposing the drum with light. The drum then transfers the toner to the paper or other media to be printed.

To expose the drum, various imaging devices can be used. Lasers scan the drum pixel-by-pixel. Spatial light modulators (SLMs) can expose an entire line (or a number of lines) at one time. Both types of imaging devices are digital in the sense that, at some point prior to being printed, the image to be printed is represented by pixel data in bit-map form. In other words, the image is logically divided into pixels, each pixel having a pixel value that is one or more bits in resolution.

The data received by the printer is typically page description data, which the printer rasterizes into pixel values having a certain bit-resolution. The higher the bit resolution, the more greyscale levels that are represented. The actual printing capability of a particular printer may permit the same or a different number of greyscale values. Various techniques have been developed for printing greyscale. For acceptable printing, at least 256 greyscale levels is considered acceptable.

One approach to printing greyscale levels is to vary the number or intensity of exposures of each pixel, thereby controlling the amount of toner at the corresponding location on the drum. This in turn determines the perceived darkness of the "dot" printed by that drum location. For example, in the case of a laser printer, the light intensity can be modulated. In the case of an SLM, a series of micro-images can be used, with each micro-image indicating whether each element of the SLM is to be on or off during a line period. This method results in "multi-level" digital values per pixel, but the number of available levels is limited to less than 256 levels.

Another approach to greyscaling is known as "screening". This method can be used to increase the greyscale levels beyond the per-pixel capability of a particular printer. In general, the image is screened into cells of m×n pixels. Each pixel in the cell is given a greyscale value that will result in a certain perceived greyscale value for the cell. This is because the eye integrates the pixels in the cell so as to perceive a single "spot".

Screening can be used with printers whose per-pixel capability is only black or white or with multi-level printers. As an example of the former, if an image were screened into cells having a size of 4×4 pixels, and eight pixels in the cell were on and eight were off, the printed "dots" corresponding to that cell would be perceived as having a greyscale value between black and white.

When screening is combined with multi-level capability, the technique is known as "multi-level screening". For example, suppose a printer can provide 16 greyscale levels per-pixel. If a cell has 4×4 pixels, one pixel is printed at level 15, another at level 10, and the other 14 at level 0, the cell would have a perceived greyscale of 25. In this manner, the cell can represent 241 greyscale levels, where 241=(16−1)× 4×4+1.

Some printer systems have improved image quality when the screening results in a concentration of exposures on the page. For example, in one-dimensional "line-screening" the entire image is screened into diagonal lines and the exposures are concentrated along these lines. The result is a less "noisy" image, especially at low intensity levels. Screening can also be multi-dimensional, such as by clustering exposures around perpendicular lines or around the midpoint of the cell. Assigning pixel values in this manner is also referred to as "modulating" the data.

The greyscale method and modulation determine the bit resolution and the particular values of the pixel data. However, it is often necessary to quantize the pixel data to a smaller bit resolution. For example, a printer might be capable of printing 8-bit pixel data, but its exposure unit might have a limited input bandwidth. In this case, the data could be quantized for input to the exposure unit and dequantized within the exposure unit for printing. Or, to reduce memory requirements, it might be desired to store only 4-bit data. In this case, the image data could be quantized to 4-bit data, stored, and then dequantized prior to printing.

When quantization is performed in a printer that uses modulated data, existing quantization methods are performed as part of the screening process. When pixels are assigned their modulated greyscale values, a look-up table assigns a modulated value having the quantized bit resolution. The same look-up table is used for all pixels.

SUMMARY OF THE INVENTION

Various aspects of the invention involve different methods of "dynamic quantization". The quantization is "dynamic" in the sense that different pixel values in the same image are quantized with different quantization tables, as determined by one or more pixel or image parameters.

One aspect of the invention is dynamic quantization based on a pixel position parameter. Specifically, each pixel's quantization is determined by the position of the pixel with respect to an image screen. To implement this method, the image is first screened by logically dividing it into cells and screen elements, such as lines or dots. Each input pixel value is then classified according to its position in the cell. The values are modulated, that is, assigned values that will result in a clustering of exposures around the screen elements. The modulated pixel values are then quantized, such that the quantization of each pixel value is performed according to the position of the pixel with respect to the screen.

Another aspect of the invention is dynamic quantization based on an image content parameter, such as whether the image is text or solid-filled or pattern-filled. Dynamic quantization can also be performed on data that is compressed by differential pulse code modulation, with the quantization being based on buffer fullness and/or a compression ratio.

An advantage of the invention is that the desired modulated image is better-approximated, leading to better image quality. Conversely, for the same image quality, fewer bits can be used for quantization, leading to memory savings.

DETAILED DESCRIPTION OF THE INVENTION

The invention described herein is in terms of an electrophotographic printer, specifically a printer having a photoconductive drum that is exposed with light. However, the same concept could be applied to any digital printer that prints greyscale images from modulated pixel data. In general, the invention is directed to providing pixel data when the pixel values are to be both modulated and quantized from one bit-resolution to another. As explained below, the quantization is dynamic, in that different pixels of the same image are quantized differently according to parameters such as pixel position or image content.

For purposes of example it is assumed that the printer has a greyscale capability of 1024 levels, using multi-level screening. Thus, the pixel data representing the image to be printed has a 10-bit pixel resolution prior to being converted to exposure data by the exposure unit. The input data may or may not have the same bit resolution. As explained below, it is further assumed that at some point in the printing process, between receipt of the input data and conversion to exposure data, the pixel data is to be quantized to some smaller bit resolution.

Screening and Modulation

Figure 1:
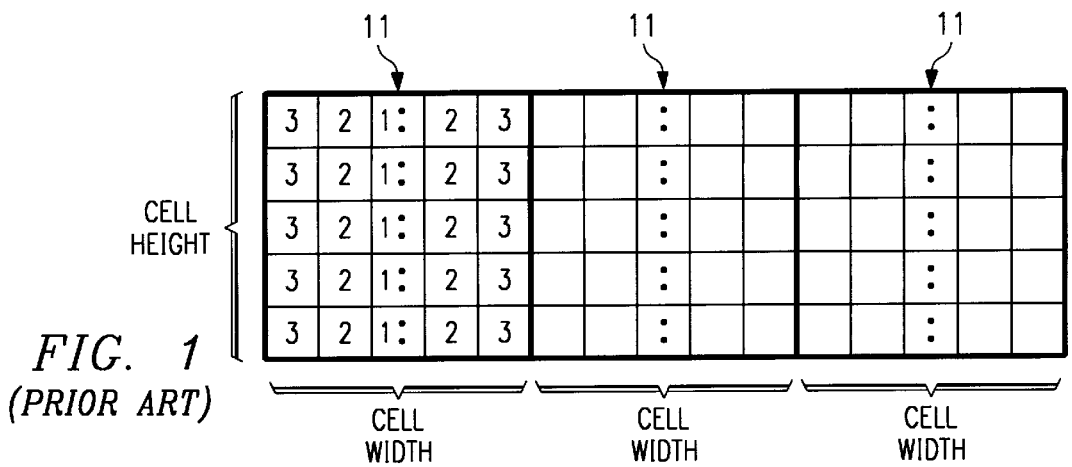
FIG. 1 illustrates a line screen for modulating pixel data.

FIG. 1 illustrates a portion of a line screen for printing an image. The image is logically divided into cells. Each cell represents a number of pixels that will be used to print that part of the image, and has a size of m×n pixels. In the example of FIG. 1, there are 3 cells, each cell having 5×5 pixels.

For one-dimensional line screening, the image is screened with parallel lines 11, along which pixel exposures are to be clustered. In the example of this description, the lines (shown as dotted lines) are in the process direction, that is, the direction of rotation of the drum. Each cell has one line associated with it.

The cells are in a repeating pattern—each cell is the same size and each has its line(s) in the same location. When the cells are tiled together, the lines merge seamlessly, creating the effect of a line screen. The cells facilitate data processing, in that the processing for each cell is computationally the same, except for the different pixel values.

FIG. 1 also illustrates, in one cell, a classification of pixels based on distance from the nearest line. In this example, the cell has three classes, with Class 1 denoting the pixels that are least distant from the line and Class 3 denoting the pixels that are most distant. Each cell has its pixels classified in this manner. Once the pixels are classified, the relationship between the input and the output for each class of pixels is defined by a tone curve.

Figure 2:
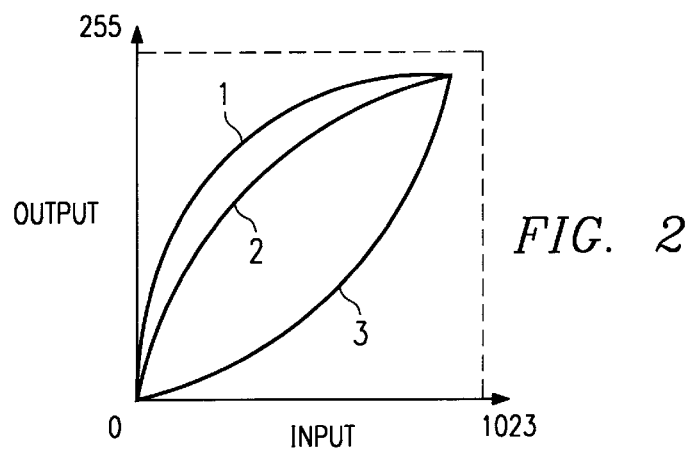
FIG. 2 illustrates tone curves used to assign modulated pixel values in accordance with the invention.

FIG. 2 is a set of tone curves for the line-screen of FIG. 1. Each class of pixel has an associated tone curve. The tone curves are designated 1–3 to correspond to the classes of pixels. Each tone curve maps a given input pixel value to a given output pixel value.

For each pixel value, the tone curve used to map the input value to the output value is determined by that pixel's classification. In general, for a given input value, a Class 1 pixel would have a higher output value than a Class 2 or Class 3 pixel. In other words, for a given input greyscale value, pixels closer to lines have higher output values than pixels that are farther away from lines. This ensures that exposures are clustered in the area of the lines on the screen. In general, the tone curves may be arbitrarily defined. However, the usual motivation for using tone curves is consistent with FIG. 2, so as to generate high contrast modulation in accordance with a screen.

A mapping process implements the tone curves. In the example of this description, the pixel values that are input to the mapping process are the 8-bit values resulting from rasterization of page description data, performed by the printer's raster image processor. As stated in the Background, in prior art methods, quantization is performed during modulation and the output of the tone curve mapping would be quantized pixel values. However, in the method of the invention, as shown in FIG. 2, the output values are not quantized. In the example of this description, they are 10-bit values, which is the printer's greyscale capability. In other embodiments, the output values could have some other bit resolution other than the quantized bit resolution. As explained below, for purposes of the invention, quantization (converting from one bit resolution to another) is performed as a separate process.

Modulation may be in only one dimension as described above, or multi-dimensional. A method of two-dimensional modulation, without the features of the present invention, is described in U.S. patent application Ser. No. 08/721,880, entitled "Two-Dimensional Modulation for Line Screen Printing". Modulation around the center of each cell is described in U.S. patent application Ser. No. 08/747,291, entitled "Compression for Multi-level Screened Images". Each of these patent applications is assigned to Texas Instruments Incorporated and is incorporated herein by reference. In general, modulation is around "screen elements", whether the elements are a set of parallel lines, two sets of perpendicular lines, or a dot in the middle of the cell.

Position-based Quantization

Figure 3:
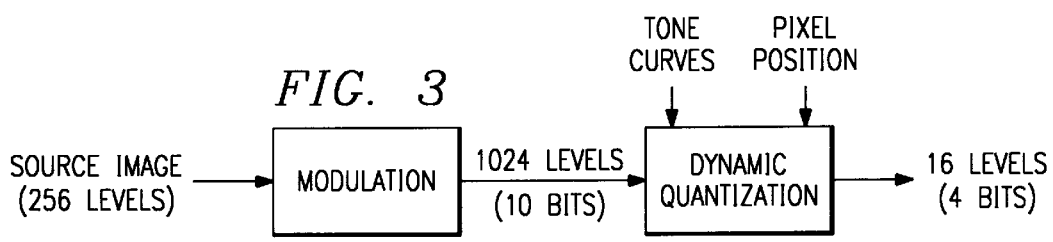
FIG. 3 illustrates how modulation and position-based quantization are separately performed in accordance with the invention.

FIG. 3 illustrates how modulation and position-based quantization are performed in accordance with the invention. As explained below, the parameter that determines the results of quantization mapping is the pixel position with respect to the image screen.

First, the input data is screened into cells and screen elements. As described above, the pixels in each cell are classified by position and assigned values that will result in clustering exposures around the screen elements. In the example of this description, 8-bit (256 levels) input data is modulated to 10-bit (1024 levels) greyscale data. In general, the screening/modulation process provides a bit resolution corresponding to whatever number of levels are available for the particular printer.

Next, the modulated pixel data is quantized, with each class of pixels being quantized by a different quantization table. For example, an input value of 180 might result in an output value of 8 for one class of pixels and 7 for another class. Thus, quantization is dependent on pixel position within the cell. In the example of FIG. 3, the 8-bit data is quantized to 4-bit data.

Figure 4A:
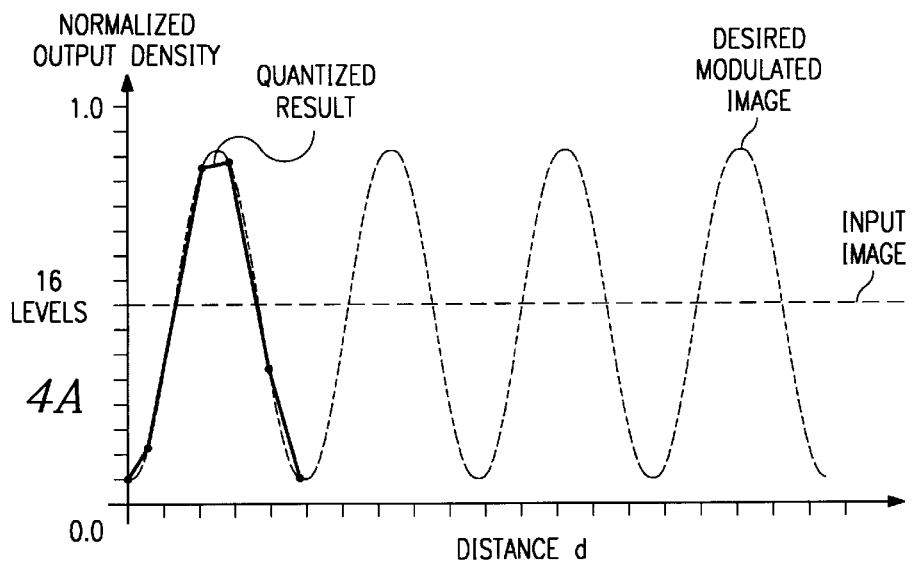
FIGS. 4A and 4B illustrate the results of the process of FIG. 3.
Figure 4B:
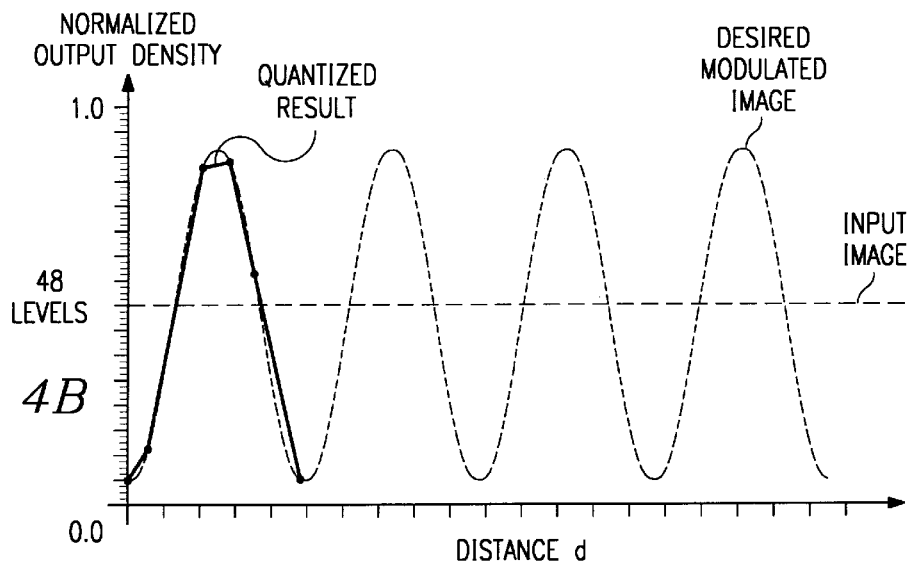

FIGS. 4A and 4B illustrate how quantization error is reduced as a result of making quantization dependent on pixel position. The input image is a single-color for all pixels, as indicated by the dashed line. The curves in FIGS. 4A and 4B represent the modulated images in the case of conventional quantization and pixel-position based quantization, respectively. Consistent with the line-screening example of FIGS. 1 and 2, the period of the modulated image is 5 pixel widths with 3 classes of pixels. With pixel-position based quantization, there are three quantization tables. Thus, the curve of FIG. 4B has as many as three times as many quantization levels as does the curve of FIG. 4A. The finer granularity of the output is illustrated by comparing the density of the output values along the output value axis. Where there are three classes of pixel positions and the quantization is to 4-bit values (16 levels), the number of overall quantization levels is 3×16=48. The desired modulation of the output image is better approximated.

Other modulation methods may result in more classes per cell and more quantization levels in the image data. Theoretically, each pixel in a cell could have a different position and be associated with a different quantization table.

The screening method described in connection with FIGS. 1 and 2 corresponds to "rational tangent" screening. A basic cell coincides with the display device grid and tiles the image to be printed. In "irrational tangent" screening, there is no such basic cell. As in rational tangent screening, the output value of a pixel depends on both its position and its input greyscale value. However, the position has arbitrary precision, with values between 0 and 1. When irrational tangent screening is used, quantization may be based on pixel position intervals. For example, the position interval p={0.0, 0.1} can have a first quantization table, with position interval p={0.1, 0.2} having a different quantization table, etc.

Content-based Quantization

Figure 5:
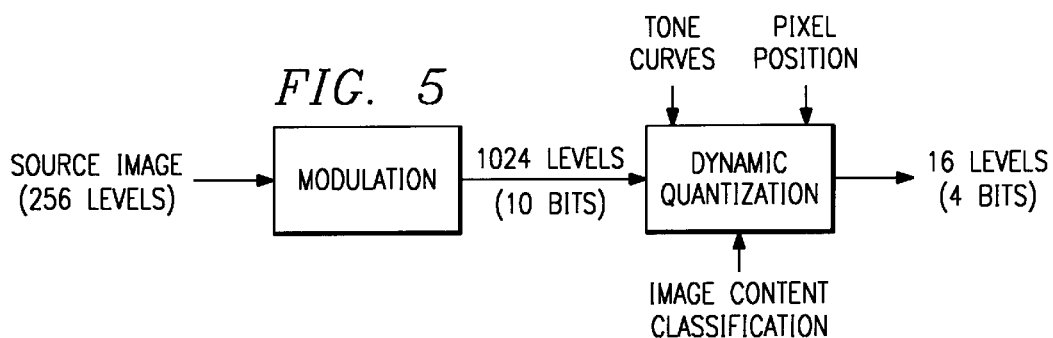
FIG. 5 illustrates how modulation and content-based quantization are separately performed in accordance with the invention.

FIG. 5 illustrates how quantization can be based on image content, such as shadows, highlights, text, fleshtone, textures, pattern fills, and solid fills. Rather than pixels being classified on the basis of their position in a cell, the cells are classified based on image content. Although this method of quantization is illustrated as being used in conjunction with the position-based method of FIG. 3, either method could be used independently.

Unlike pixel position data, image content data is not implicit from the pixel data. For content-based quantization, the printer's raster image processor can be programmed to divide the image into blocks for the purpose of classifying the block based on content type. In the simplest approach, the block boundaries could coincide with the cells of the screen. The classification can be based on the processor's knowledge of the page layout, such as from its display list. Or, the classification can be based on a feature vector. An example of the latter is classification based on the discrete cosine transform (DCT) coefficients of a block.

The processor renders the image with image content data and transmits this data with the pixel data bitstream. It can be transmitted at the line level or block level, and updated only when a classification changes. Keywords in the bitstream can be used to signal such changes, with the keyword followed by the class identifier.

For providing content-based quantized data, the rasterized image data is screened and modulated, as described above. It is then quantized, with each pixel value being quantized with a quantization table selected on the basis of that pixel's classification. If both content-based quantization and position-based quantization are to be combined, each pixel value's quantization table is determined by both the pixel's classification and the pixel's position with respect to the screen.

Compression-based Quantization

As an alternative to quantizing the modulated signal directly, quantization can be performed on a difference signal. A difference signal can be generated by prediction, resulting in a method known as Differential Pulse Code Modulation (DPCM).

For DPCM, a predictor uses position coordinates of each current pixel to predict the next pixel in the scan line. For example, if the line screens are in the scan line direction, the predictor can use the previous pixel in the scan line to predict the current pixel. If the line screens are perpendicular to the scan line direction, the pixel directly above the current pixel can be used to predict the current pixel. In general, for each pixel in a screen, its neighbors (with different weightings) can be used for the prediction. Alternatively, a normalization method can be used. Or, pixels can be reorganized on a cell basis before the prediction step as described in U.S. patent application Ser. No. 08/747,291, referenced above.

Figure 6:
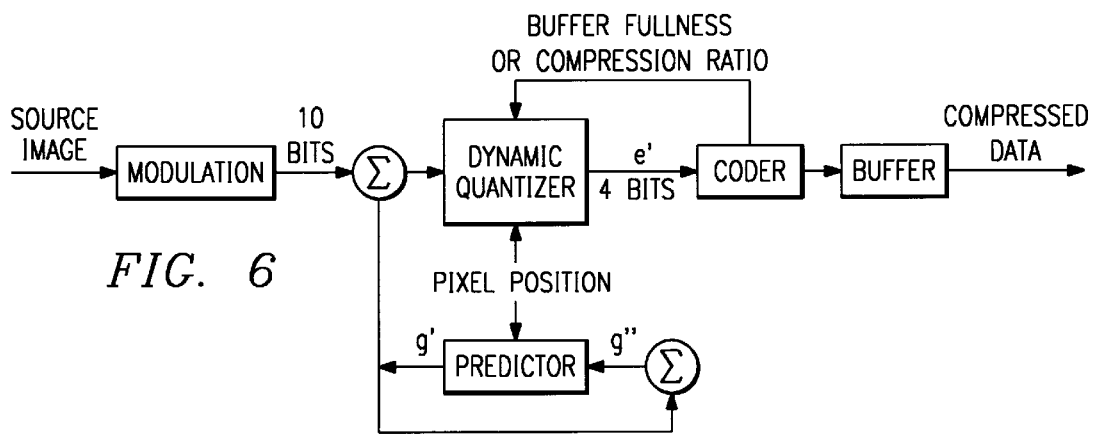
FIG. 6 illustrates how modulation may be based on buffer fullness and/or a compression ratio when the pixel data is compressed using differential pulse code modulation.

FIG. 6 illustrates a method of dynamic quantization in the context of DPCM. Typically, a DPCM differential signal has a truncated Laplacian distribution. A variable length coding scheme may be desirable to reduce the bit rate. However, this results in a variable bit rate and therefore calls for buffers at the input and output.

Quantization can be adapted to a buffer fullness measure or to a compression ratio measure. This results in a DPCM method with bit-rate control. The quantizer step size, Q, is adapted based on buffer fullness and/or compression ratio measures.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of converting input pixel values to modulated and quantized image data for use by a printer, said input pixel values representing an image to be printed and having an input bit resolution, comprising the steps of:

dividing said image into a plurality of cells, each cell comprising a plurality of pixels in two dimensions;

providing each said input pixel with a position value in accordance with the position of each pixel within the cell, there being a plurality of position values in each of said cells;

modulating each of said input pixel values in accordance with a predetermined criterion to provide modulated pixels;

providing a plurality of tonal curves, each curve respectively corresponding to a position value; and quantizing said modulated pixels such that the quantization of each modulated pixel position is performed according to said position value of said corresponding pixel, a tone curve that corresponds to the cell position and image content of the pixel that corresponds to the cell position.

2. The method of claim 1, wherein said step of dividing is rational and said step of providing said input pixel values is performed by assigning a class value to each of said input pixel values.

3. The method of claim 1, wherein said step of dividing is irrational and said step of providing said input pixel values is performed by dividing pixel positions into intervals such that each said pixel value is classified according to said intervals.

4. The method of claim 1, wherein said modulating step results in said modulated input pixel values having the same bit resolution as said input pixel values.

5. The method of claim 1, wherein said modulating step results in said modulated input pixel values having a different bit resolution than said input pixel values.

6. A method of converting input pixel values to modulated and quantized data for use by a printer, said input pixel values representing an image to be printed and having an input bit resolution, comprising the steps of:

classifying blocks of said image according to image content;

dividing said image into cells, each cell comprising a plurality of pixels in two dimensions;

providing each said pixel with a position value in accordance with the cell position of its corresponding pixel;

modulating each of said input pixel values in accordance with a predetermined criterion to provide modulated pixels;

providing a plurality of tonal curves, each curve respectively corresponding to a position value; and quantizing said modulated pixels such that the quantization of each modulated pixel position is performed according to said position value of said corresponding pixel, a tone curve that corresponds to the cell position and image content of the pixel that corresponds to the cell position.

7. The method of claim 6, wherein said modulating step results in said modulated input pixel values having said input bit resolution.

8. The method of claim 6, wherein said modulating step results in said modulated pixel values having a different bit resolution than said input bit resolution.

9. The method of claim 6, wherein said quantization is further performed according to said cell position of said corresponding pixel.

10. The method of claim 6, wherein said blocks have boundaries that coincide with boundaries of said cells.

11. The method of claim 6, wherein said step of classifying blocks is performed by using a page description language description of said image.

12. The method of claim 6, wherein said step of classifying blocks is performed by using feature vectors.

13. A method of converting input pixel values to modulated, compressed, and quantized image data for use by a printer, said input pixel values representing an image to be printed and having an input bit resolution, where the compression is performed with differential pulse code modulation, comprising the steps of:

screening said image with an image screen, such that said image is logically divided into a plurality of cells, each cell containing a subset of pixels;

classifying each of said input pixel values in accordance with the cell position of its corresponding pixel;

modulating each of said input pixel values to provide modulated pixels in accordance with the corresponding input pixel values and classification for each said pixel;

calculating predictive values of said modulated pixels;

providing a plurality of tonal curves, each curve respectively corresponding to a position value; and;

quantizing said predictive values using a tone curve and image content of the pixel that corresponds to the cell position, to provide quantized data;

coding said quantized data;

storing the results of said coding step in a buffer; and determining a buffer fullness value;

wherein said quantization step is performed according to said buffer fullness value.

14. A method for converting input pixel values to modulated and quantized image data for use by a display device, said input pixel values representing an image to be displayed and having an input bit resolution, comprising the steps of:

providing data representative of an image to be displayed on a pixel by pixel basis;

dividing said image into a plurality of cells, each of said cells having a two dimensional array of a subset of said pixels;

classifying each of said pixels in each of said cells, each cell having a plurality of different position classifications, each pixel being classified in accordance with its location within the associated cell;

providing a plurality of tonal curves, each curve respectively corresponding to a position value; and providing a data base providing an output value for a corresponding input pixel value for each of said classifications;

applying the classification, a tone curve and image content of the pixel that corresponds to the cell position for each of said pixels to said data base to obtain a said output value; and transmitting said output value to said display device.

15. The method of claim 14 wherein said display device is a printer.

16. The method of claim 14 wherein said data base is a separate different curve of said classifications relating an input pixel value to an output value for a pixel.

17. The method of claim 15 wherein said data base is a separate different curve of said classifications relating an input pixel value to an output value for a pixel.

* * * * *